(12) United States Patent
Lewish et al.

(10) Patent No.: US 6,266,661 B1
(45) Date of Patent: Jul. 24, 2001

(54) METHOD AND APPARATUS FOR MAINTAINING MULTI-INSTANCE DATABASE MANAGEMENT SYSTEMS WITH HIERARCHICAL INHERITANCE AND CROSS-HIERARCHY OVERRIDES

(75) Inventors: Keith Lewish, Philadelphia; Duane Boone, Holland; Stephen Keller, Norristown, all of PA (US)

(73) Assignee: Platinum Technology IP, Inc., Oakwood Terrance, IL (US)

( * ) Notice: Subject to any disclaimer, the term of this patent is extended or adjusted under 35 U.S.C. 154(b) by 0 days.

(21) Appl. No.: 09/203,207

(22) Filed: Nov. 30, 1998

(51) Int. Cl.[7] .................................................... G06F 17/30
(52) U.S. Cl. .................................. 707/3; 707/3; 707/102; 707/103; 707/203; 707/517; 709/203; 709/217; 717/3; 717/10; 717/35
(58) Field of Search .................................. 707/1, 4, 103, 707/3, 102, 8, 200–203, 517; 705/410; 709/302, 203, 217, 315; 345/329–335; 717/1, 3, 10, 11, 35

(56) References Cited

U.S. PATENT DOCUMENTS

| | | | |
|---|---|---|---|
| 5,442,784 | * | 8/1995 | Powers et al. .................. 707/102 |
| 5,454,101 | * | 9/1995 | Mackay et al. ...................... 707/3 |
| 5,457,643 | * | 10/1995 | Vahey et al. ...................... 361/683 |
| 5,524,244 | * | 6/1996 | Robinson et al. .................. 717/5 |
| 5,758,154 | * | 5/1998 | Qureshi ................................ 713/1 |
| 5,806,065 | * | 9/1998 | Lomet .................................. 707/8 |
| 5,991,753 | * | 11/1999 | Wilde .................................. 707/2 |
| 6,021,413 | * | 2/2000 | Vaduvur et al. .................. 707/201 |
| 6,055,538 | * | 4/2000 | Kessenich et al. .............. 707/101 |
| 6,096,094 | * | 8/2000 | Kay et al. ............................ 717/1 |
| 6,115,040 | * | 9/2000 | Bladow et al. .................... 345/335 |

OTHER PUBLICATIONS

Fotouhi, Farshad et al., "The Generalized Index Model for Object–Oriented Database Systems", Conference Proceedings of the Tength Annual International Phoenix Conference on Computers and Communications, Mar. 27–30, 1991, pp. 302–308.*

Lin, Jiann–Horng et al., "Hierarchical Floorplan Design on the Internet", Proceedings of the (ASP–DAC '99) Asia and South Pacific Design Automation Conference, Jan. 18–21, 1999, pp. 189–192, vol. 1.*

Murthy, Shree et al. "Loop–Free Internet Routing Using Hierarchical Routing Trees", INFOCOM'97, Sixteenth Annual Joint Conference of the IEEE Computer and Communication Societies. Driving the Information Revolution, Apr. 7–11, 1997, pp. 101–108, vol. 1.*

Padmanabhan, M. et al., "Decision–tree based feature–space quantization for fast Gaussian computation", Proceedings of the 1997 IEEE workshop on Automatic Speech Recognition and Understanding, Dec. 14–17, 1997, pp. 325–330.*

\* cited by examiner

Primary Examiner—Hosain T. Alam
Assistant Examiner—Shahid Alam
(74) Attorney, Agent, or Firm—Baker & McKenzie

(57) ABSTRACT

An application configuration system including a database, a preprocessed configuration ("PPC") service processor that communicates with the database, a data exchange system preprocessed configuration application program interface ("DEX PPC API") that communicates with the PPC service processor, and an application that communicates with the DEX PPC API. A plurality of files having configuration data are stored in the database in a hierarchical arrangement.

5 Claims, 5 Drawing Sheets

METHOD AND APPARATUS FOR MAINTAINING MULTI-INSTANCE DATABASE MANAGEMENT SYSTEMS WITH HIERARCHICAL INHERITANCE AND CROSS-HIERARCHY OVERRIDES

FIELD OF THE INVENTION

The present invention relates to the field of database management systems, in particular to a database having a hierarchical tree of configuration files.

BACKGROUND INFORMATION

Applications are frequently distributed across many different computer systems. Such applications require access to configuration data in a timely and fault-tolerant manner. Configuring these applications can be complicated and time-consuming because many individual configuration settings may have to be provided. Also, relationships may exist between the configuration data located on different computers that have to be established and maintained over time.

Although configuring applications requiring either editing text files that are read by the applications or updating the system registry with the appropriate configuration settings have generally been accepted, such systems are prone to error and are quite time consuming since the required operations are usually performed manually on a machine-by-machine basis.

SUMMARY OF THE INVENTION

An object of the present invention is providing a system for applications to access configuration data in a timely and fault-tolerant manner.

Another object of the present invention is providing a method for performing an operation on a requested file in a hierarchical tree.

It is still another object of the present invention to provide a method for processing a lower-level file utilizing configuration data of a higher-level file in a hierarchical tree.

An aspect of the present invention provides an application configuration system including a database, a preprocessed configuration ("PPC") service processor that communicates with the database, a data exchange system preprocessed configuration application program interface ("DEX PPC API") that communicates with the PPC service processor, and an application that communicates with the DEX PPC API. A plurality of files having configuration data are stored in the database in a hierarchical arrangement.

Another aspect of the present invention includes a method for performing an operation on a requested file stored in a hierarchical tree with other files. The method includes constructing a path between a requested file and a root node of the hierarchical tree, processing each of a plurality of files that are included in the path in order from the root node of the hierarchical tree to the requested file, and constructing a result set of the requested file. The processing of each file includes adding or replacing in a resultant file a first set of values associated with keywords in a lower-level file being processed instead of a second set of values associated with corresponding keywords in an upper-level file. The processing of each file of the present invention may also include adding to the resultant file a keyword/value pair of the lower-level file for a keyword not in a corresponding section of the higher-level file.

DETAILED DESCRIPTION

Figure 1:
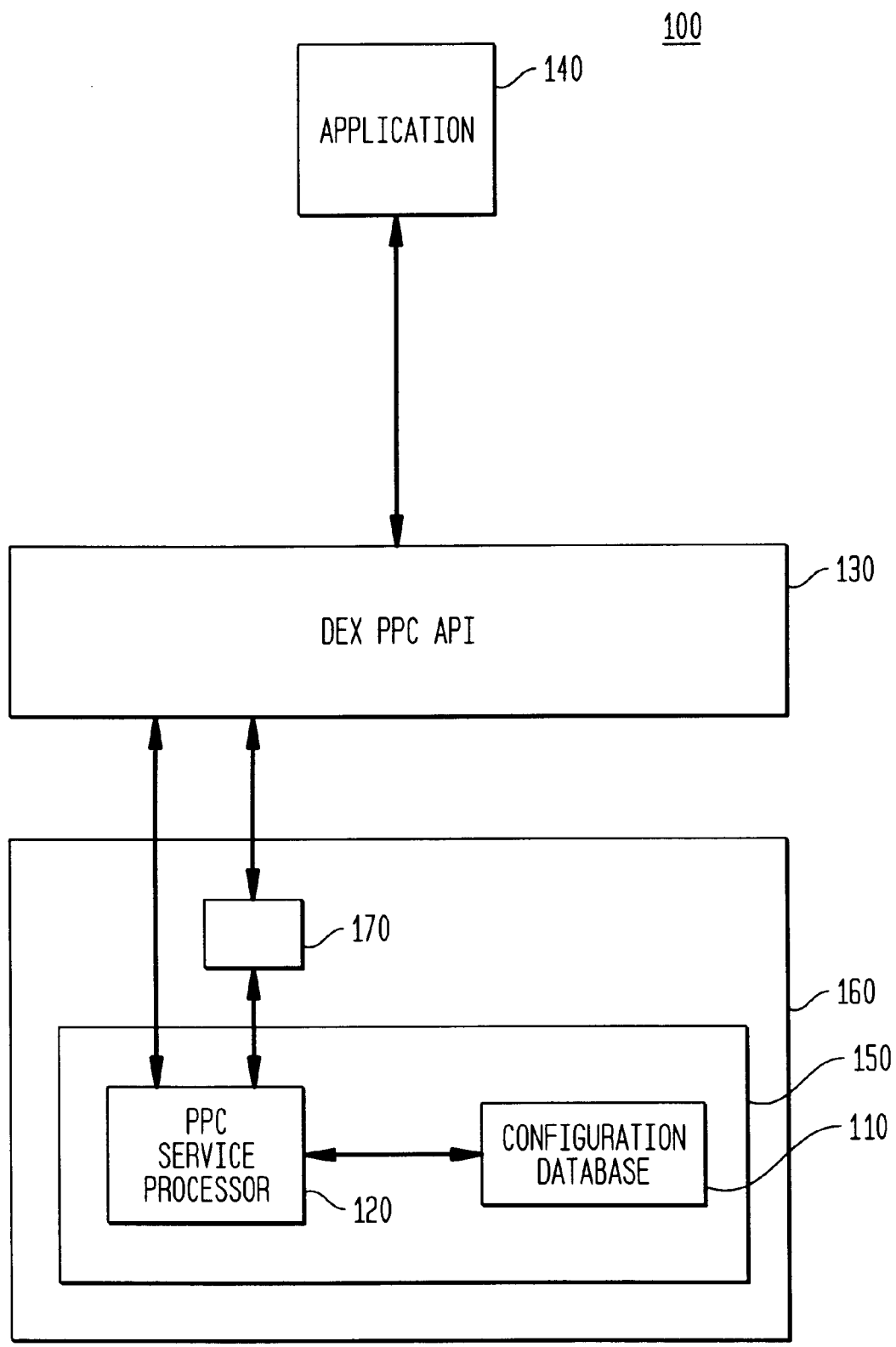
FIG. 1 shows a functional block diagram of an exemplary embodiment of the present invention.

FIG. 1 shows a functional block diagram of an exemplary embodiment of the present invention. As shown in FIG. 1, an application configuration system 100 includes a configuration database 110, a preprocessed configuration ("PPC") service processor 120 that communicates with the configuration database 110, a data exchange system preprocessed configuration application program interface ("DEX PPC API") 130 that communicates with the PPC service processor 120, an application 140 that communicates with the DEX PPC API 130 such as requesting files stored in the configuration database 110 from the PPC service processor 120, and a data exchange system ("DEX") 150 that communicates with the DEX PPC API 130. In an exemplary embodiment of the present invention, the application configuration system 100 may also include a collection of common services ("POEMS") 160 that may be used by applications 140. POEMS may be embodied as, for example, a hosting machine. POEMS may include, for example, the DEX 150, PPC service processor 120, configuration database 110, and a service manager 170. POEMS is described in the Platinum Provision Common Services Reference Guide.

Figure 2:
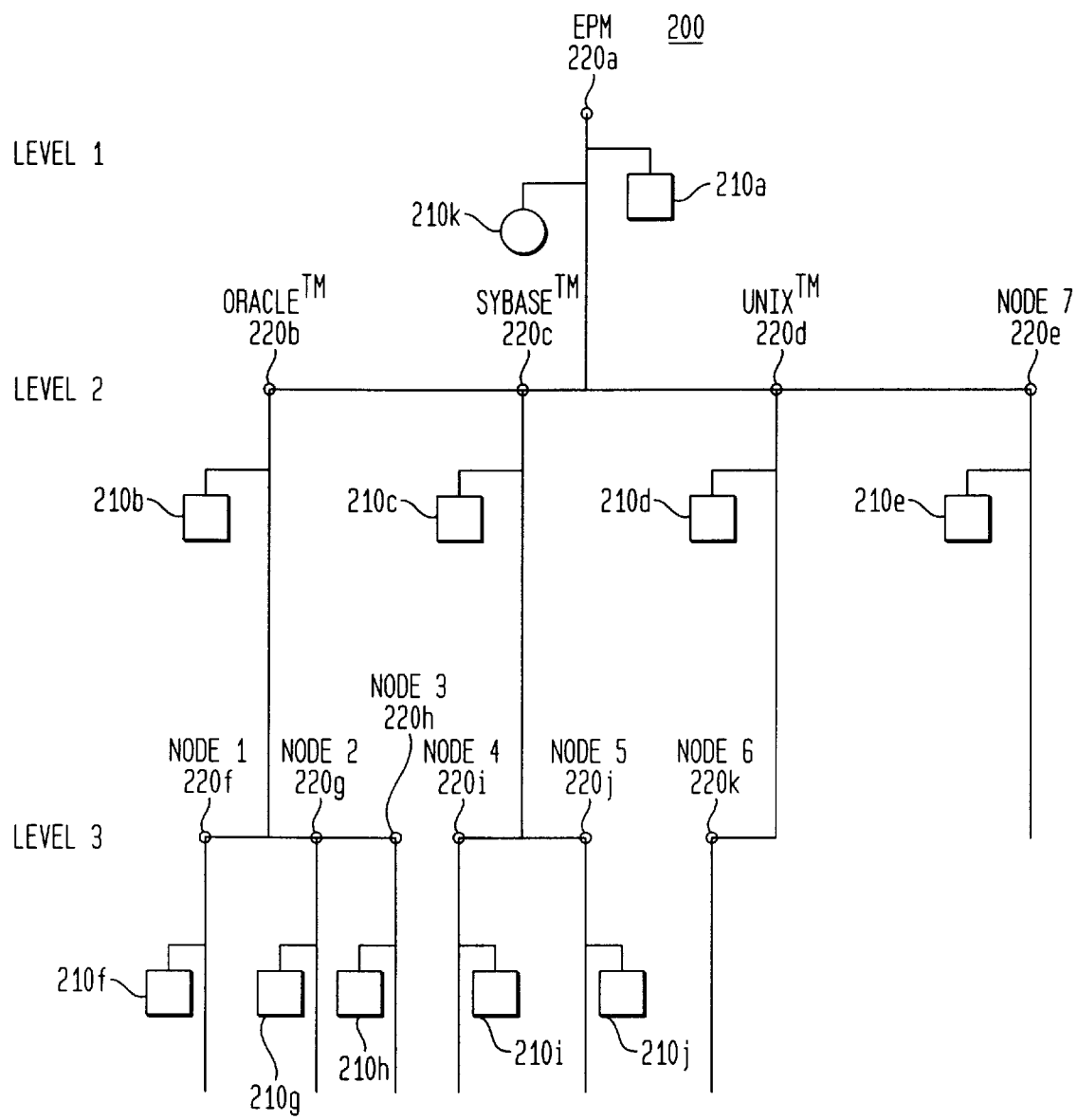
FIG. 2 shows a graphical representation of an exemplary embodiment of a hierarchical arrangement in which files are stored in a database of the present invention.

In an exemplary embodiment of the present invention, the DEX 150 may include the PPC service processor 120 and the configuration database 110. The configuration files 210a–210j, e.g., files that include configuration data, are stored in the configuration database 110 in a hierarchical arrangement ("configuration tree") such as in a directed-acyclic relationship as shown in FIG. 2. In an exemplary embodiment of the present invention, the configuration tree 200 as shown in FIG. 2 includes a plurality of levels, e.g., three levels. Each level may include a plurality of nodes 220a–220k and the nodes 220a–220k may include files. For example, level 1 includes an application node such as Enterprise Performance Management ("EPM") node 220a; level 2 includes the ORACLE™ node 220b; SYBASET™ node 220c, UNIX™ node 220d, and node 7 220e; and level 3 includes node 1 220f through node 6 220k. The files are prioritized with respect to each other based on the level of the node with which each of the respective files are associated. As shown in FIG. 2, for example, the configuration file 210a is a level 1 file since it is associated with a level 1 node.

In an exemplary embodiment of the present invention, a lower-level file is given priority over a higher-level file. As shown in FIG. 2, for example, the configuration file 210f of node 1 220f is a level 3 file which has priority over the configuration file 210b of the ORACLE™ node 220b which is a level 2 file. A node at the first level or top level is called a root node 220a. In FIG. 2, for example, the EPM node 220a is a root node. A node at the lowest possible level for each path from the root node is a leaf node. In FIG. 2, for example, node 1 210f through node 7 220e are leaf nodes.

The number of levels and nodes and the relationship between the nodes, e.g., structure, and the name of the nodes, e.g., identifiers, in the configuration tree 200 are defined by the application 140. Accordingly, the configuration tree 200 may reflect the deployment pattern of any application 140. The deployment patterns may include, for example, a business organization, a computer network, and an internal architecture of a software application. In an exemplary embodiment of the present invention, the configuration tree 200 could be partitioned across multiple machines. The configuration database 110 may be, for example, vertically or horizontally partitioned. Horizontally partitioning the configuration database 110 results in different paths of the configuration tree 200 being hosted on different machines. Vertically partitioning the configuration database results in different levels of the configuration tree 200 being hosted on different machines. Whether the partitioning is, for example, vertical or horizontal, the PPC service processor 120 constructs a path across partitions and assembles information requested by the application 140 in a path that spans partitions. The assembled information, e.g., result set, may include, for example, a file unprocessed by the PPC service processor 120, e.g., raw file, a file processed by the PPC service processor 120, e.g., cooked file, or a hierarchical arrangement of files either processed or unprocessed by the PPC service processor 120. The result set may be one or more newly created resultant files or one or more of the processed files themselves being modified.

Figure 3:
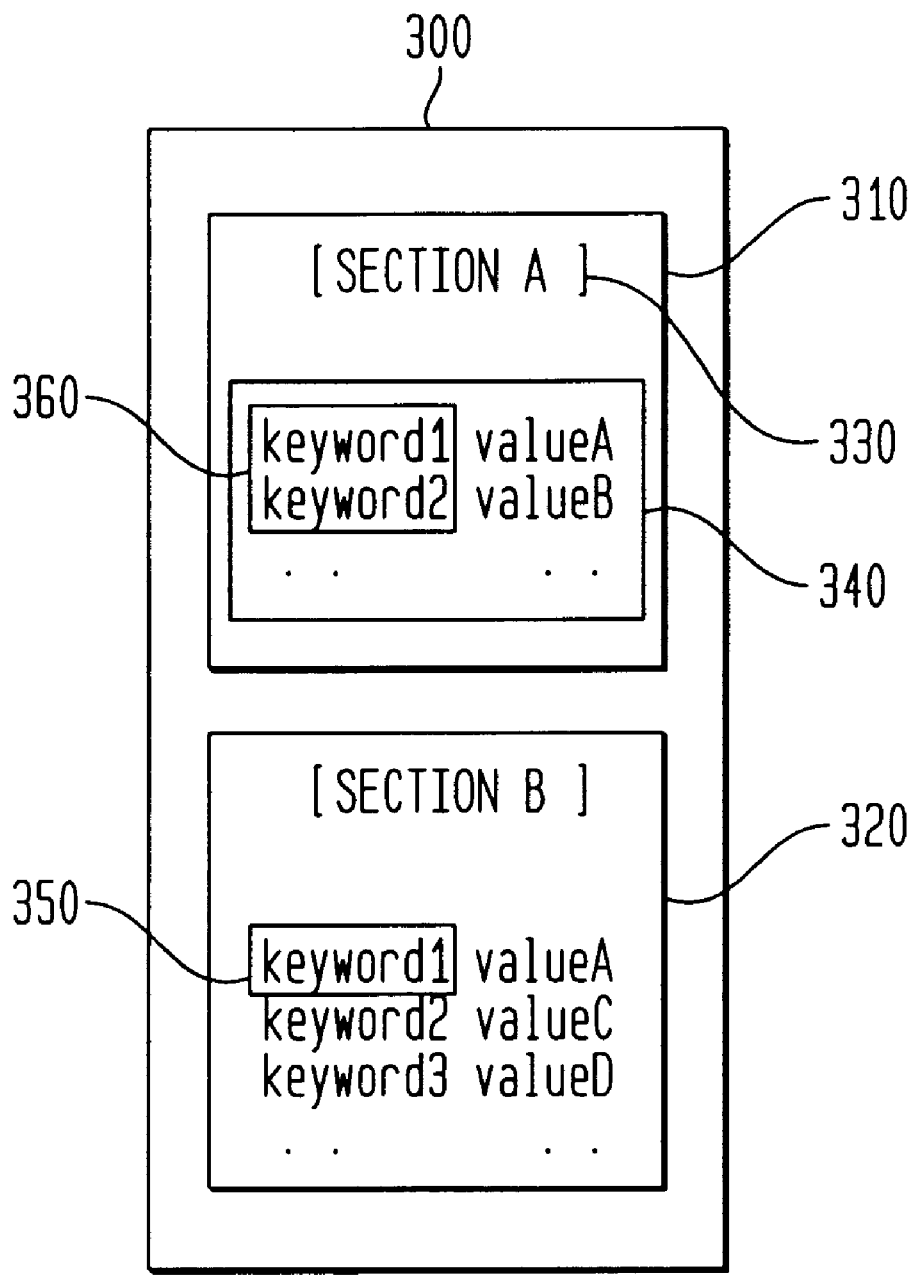
FIG. 3 shows an exemplary embodiment of a structure of a file having configuration data of the present invention.

In an exemplary embodiment of the present invention, a configuration file 300, for example, as shown in FIG. 3, may be divided into a plurality of sections 310, 320. Each of the sections 310, 320 may have a section name 330 such as Section A and may contain a set of keyword/value pairs 340 with each of the keywords 360 having a keyword name 350 such as keyword1. In an exemplary embodiment of the present invention, keywords 360 are unique within a respective section for a given file.

In an exemplary embodiment of the present invention, the DEX PPC API 130 is an interface by which an application 140 makes, for example, PPC requests and receives PPC results. DEX PPC API 130 defines the interface between the application 140 such as a point product and the PPC service processor 120. The DEX PPC API 130 may be implemented as a C language interface and a shell-level interface for use in scripts. Further, a C++ class encapsulating the DEX PPC API 130 may be defined. The DEX PPC API 130 processes messages such as requests by applications to transfer data to and from the application 140 and the DEX 150. The DEX is a collection of services that manage data. In an exemplary embodiment of the present invention, the DEX 150 may include the PPC service processor 120. In an exemplary embodiment of the present invention, the PPC service processor 120 may be located on a remote machine. The DEX PPC API 130 performs processing including routing messages such as requests by applications 140 to the PPC service processor 120, for example, by a service manager 170. The service manager is a message router that routes messages, for example, from the application 140 to the PPC service processor 120. The service manager 170 may be one of the services of POEMS 160. Accordingly, applications 140 that interface with the DEX PPC API 130 do not have to incorporate a system for the management of messages such as requests by applications 140.

Applications 140 create the PPC service processor request to communicate with the PPC service processor 120 through the DEX PPC API 130, submit the request, and process the result set such as a cooked file, e.g., a requested file processed by the PPC service processor 120 as a result of the request by the application 140. In an exemplary embodiment of the present invention, the DEX PPC API 130 defines helper functions that the application 140 may use to create the request, submit the request, and process the result set from the request. In an exemplary embodiment of the present invention, the application 140 does not directly manipulate any data structure used by the DEX PPC API 130, but rather uses the helper functions. Further, applications 140 that use the DEX PPC API 130 include, for example, compiled header files that prototype functions in the DEX PPC API 130 compiled with source code of the application 140. Applications 140 that access the PPC service processor 120 are recompiled to incorporate the DEX PPC API 130. The applications 140 may also include a link to libraries of the DEX PPC API 130.

In an exemplary embodiment of the present invention, the PPC service processor request provided by the application 140 to the DEX PPC API 130 may include creating or deleting nodes within the configuration tree 200, saving or retrieving a configuration file 300 or INCLUDE file, and retrieving a configuration file 300 for a given leaf node. The configuration file retrieved, for example, may have been processed by the PPC service processor 120 incorporating the respective configuration data from all of the applicable files in the respective path from the root node 220a of the configuration tree 200 to the given leaf node.

Figure 4:
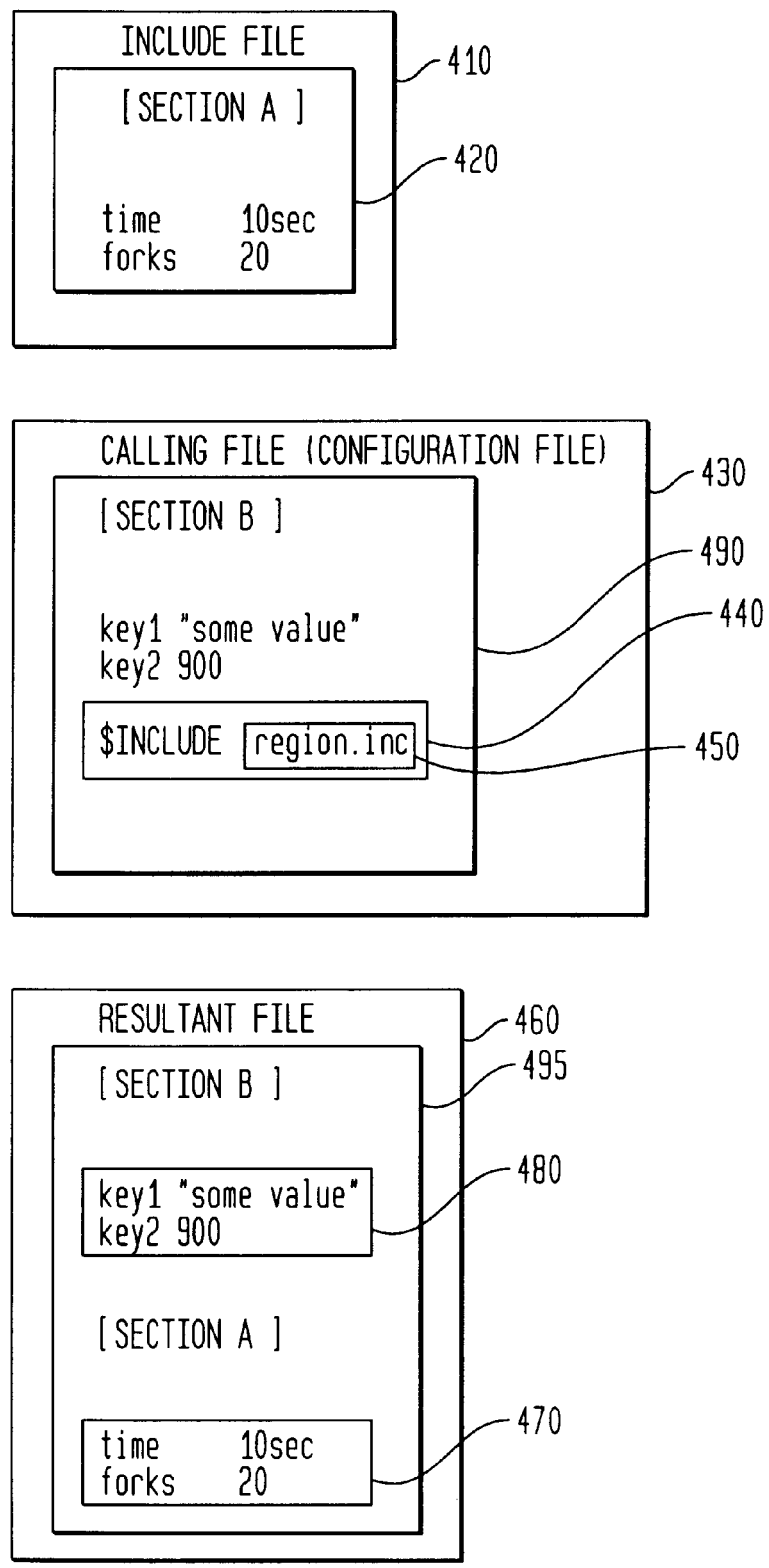
FIG. 4 shows contents of an INCLUDE file, a calling file and a resultant file after processing the calling file according to an exemplary embodiment of the present invention.

The PPC service processor 120 manages files such as configuration files 210a–210j and INCLUDE files 210k and the hierarchical relationship between the files 210a–210k in the configuration database 110. The application 140 creates an INCLUDE file 210k having a common set of configuration data. An application 140 can use a macro, for example, an $INCLUDE macro to copy the contents of the INCLUDE file 210k into another file such as a resultant file 460 or a file in the configuration tree 200. In an exemplary embodiment of the present invention as shown in FIG. 4, an INCLUDE file 410 contains a section 420 in which the section 420 does not appear in any other INCLUDE file or calling file 430. A calling file 430 is a file which includes an instruction 440 to run the, for example, $INCLUDE macro having a parameter 450 to identify the INCLUDE file 410. In an exemplary embodiment of the present invention, the parameter 450 may be the name of the INCLUDE file 410, for example, "region.inc" as shown in FIG. 4. Accordingly, as shown in FIG. 4, incorporating the configuration data of an INCLUDE file 410 may add additional data 470 from the INCLUDE file to, for example, the resultant file 460 and will not cause other data 480 of the resultant file 460 to be replaced. In an exemplary embodiment of the present invention, INCLUDE files 410 do not contain calls, e.g., an instruction to execute the $INCLUDE macro, to other INCLUDE files. The PPC service processor 120 also recognizes and processes the files 210a–210k stored in the configuration tree 200. In an exemplary embodiment of the present invention, the PPC service processor 120 may perform an override logic operation when a file from the configuration database 110 is being requested, for example, by the application 140.

The override logic operation includes the PPC service processor 120 constructing a path between a requested file and the root node 220a of the configuration tree 200. The override logic operation also includes the PPC service processor 120 processing each of the files 210a–210k, in order, that are included in the respective path, for example, from the root node 220a of the configuration tree 200 to the file being requested. Processing a file may include executing instructions such as an $INCLUDE macro, determining whether a higher-level file exists, analyzing the sections and keyword/value pairs of the file being processed and the higher-level file, determining whether the higher-level file has the same keyword in a corresponding section of the lower-level file being processed, and overriding the higher-level file. In an exemplary embodiment of the present invention, a resultant file 460 may be created and include the results 495 of the files 430 being processed with or without the configuration files being changed. For example, as shown in FIG. 4, the calling file 430 being processed was not changed. The override logic operation also includes the PPC service processor 120 constructing a result set of information requested by the application 140 such as a processed requested file. The result set may be provided to the application 140 that made the request by the PPC service processor 120. In an exemplary embodiment of the present invention, the result set may also be provided by the PPC service processor 120 to a disk of a system of the requesting application 140. Accordingly, the application can access locally the result set provided by the PPC service processor 120 whether or not the PPC service processor 120 is available. In an exemplary embodiment of the present invention, the result set may be constructed in an additive manner, e.g., with each file at each level of the configuration tree 200 adding new data to the result set. For example, the additive process constructs a result set that is returned to the application 140. In the course of constructing the result set, rules are applied with respect to keywords and values that appear at multiple levels in the configuration tree 200. Keywords and values in a file at a lower level, for example, replace respective keywords and values that have occurred in a file at a higher level. INCLUDE files may also be added to the file as it is constructed. Keywords and values introduced through an INCLUDE file may also be replaced by the same keywords and values occurring in a file lower in the configuration tree.

Figure 5:
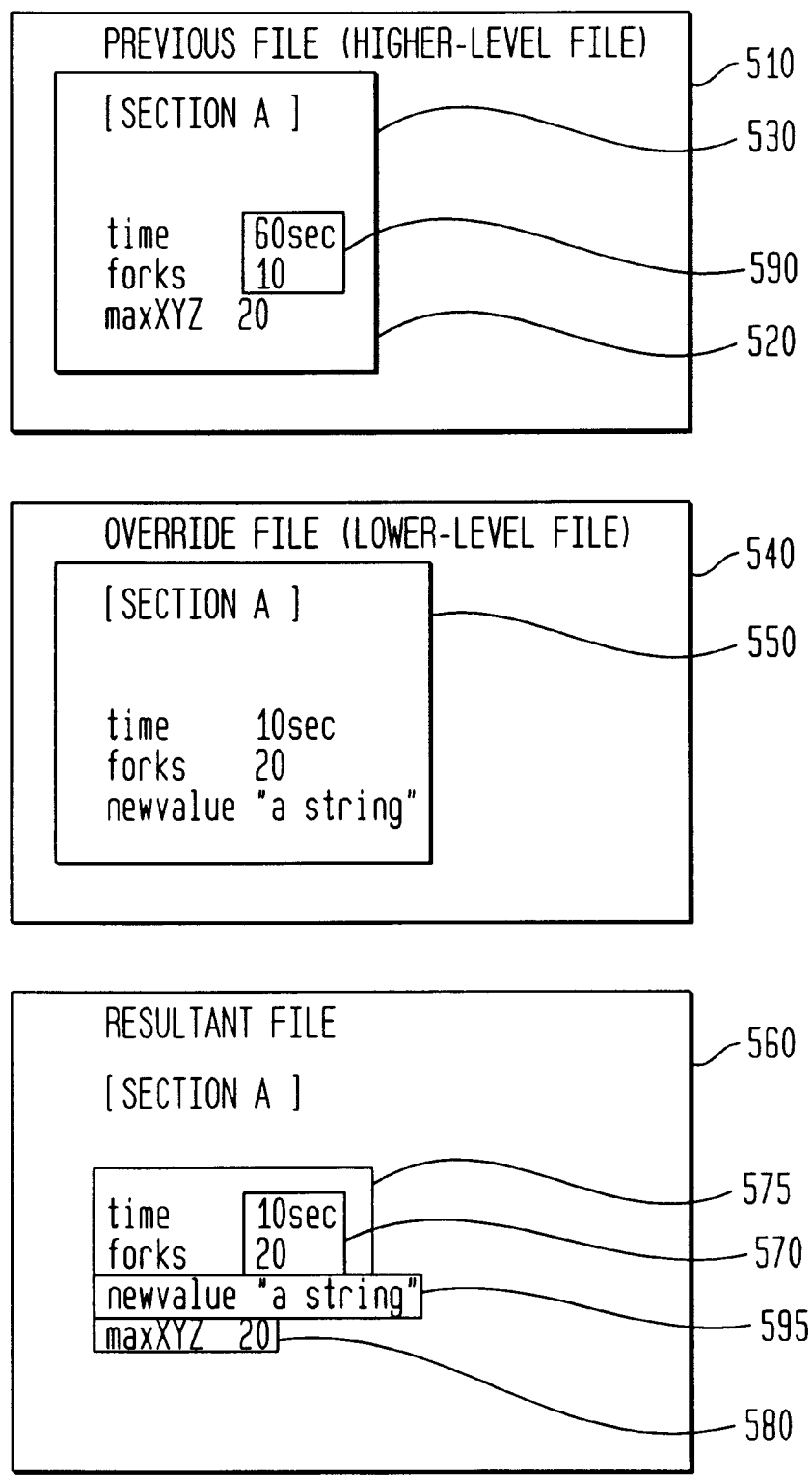
FIG. 5 shows contents of a higher-level configuration file and a lower-level configuration file, and a resultant file after processing the lower-level configuration file according to an exemplary embodiment of the present invention.

As shown in FIG. 5, configuration data of a file 540 at a lower level overrides corresponding configuration data of a file 510 at a higher level. The process of overriding data, for example, includes using values associated with keywords in lower-level files to replace the values associated with corresponding keywords in upper-level files. Alternatively, in an exemplary embodiment of the present invention, the process of overriding data may include a resultant file 560 using values 570 associated with keywords in lower-level files instead of the values 590 associated with corresponding keywords in upper-level files. For example, as shown in FIG. 5, the resultant file 560 includes associated values 570 instead of values 590 of the higher-level file. The process of overriding data may also include, for example, adding to a higher-level file 510 the keyword/value pair 595 of a lower-level file 540 for a keyword not in a corresponding section of the higher-level file 510. Alternatively, in an exemplary embodiment of the present invention the process of overriding data may also include, for example, adding to a resultant file 560 of the processed lower-level file the keyword/value pair 595 of a lower-level file 540 for a keyword not in a corresponding section of a higher-level file 510. For example, as shown in FIG. 5, keyword/pair 595 is added to resultant file 560.

PPC service processor processing of node 1 220f includes processing the files from the root node 220a to the node 1 configuration file 210f in the respective path. Accordingly, the configuration file 210a of the root node 220a, e.g., EPM node, is processed and, for example, in an exemplary embodiment of the present invention resultant file including the processed EPM node configuration file is created. Subsequently, the configuration file 210b for the ORACLE™ node 220b is processed with the resultant file being overridden by the ORACLE™ node configuration file 210b. Subsequently, the configuration file 210f for node 1 220f is processed with the resultant file being again overridden by the node 1 configuration file 210f.

Node 7 processing includes processing the files from the root node 220a, e.g., EPM node, to the node 7 configuration file 210e. Accordingly, the EPM configuration file 210a is processed and, for example, in an exemplary embodiment of the present invention a resultant file including the processed EPM configuration file is created. Subsequently, the node 7 configuration file 210e is processed and the resultant file is overridden by the node 7 configuration file 210e.

Processing node 6 includes processing the files from the root node 220a, e.g., EPM node, to node 6 220k. Accordingly, the configuration file of the root node 220a, e.g., EPM node, is processed and, for example, in an exemplary embodiment of the present invention a resultant file including the processed EPM node configuration file is created. The configuration file 210d for the UNIX™ node 220d is processed with the resultant file being overridden by the UNIX™ node configuration file 210d. Since there is no configuration file for node 6 220k, the resultant file for the configuration processing of node 6 220k will be the processed configuration file of the EPM node 220a overridden by the processed configuration file for the UNIX™ node 220d. The overridden process between files allows the application to change parameters from a previous file which may, for example, also have been overridden. In an exemplary embodiment of the present invention as shown in FIG. 5, a section that appears in both the previous file 510 such as a higher-level file and in the override file 540 such as a lower-level file being processed should be the union of both sections. The contents of the override file 540, however, have priority over the previous file 510 where the keywords of the respective files 510, 540 match such as "time" and "forks" for the corresponding sections 530, 550 as shown in FIG. 5. Further, the first keyword name within a respective section found in a lower-level file being processed that matches the respective keyword name of the respective section of a higher-level file in the same path is used to process the respective file. For example, the value associated with the respective first keyword name in the lower-level file is used for the respective keyword name in the resultant file.

The embodiments described above are illustrative examples of the present invention and it should not be construed that the present invention is limited to these particular embodiments. Various changes and modifications may be effected by one skilled in the art without departing from the spirit or scope of the invention as defined in the appended claims.

What is claimed is:

1. A method for performing an operation on a requested file stored in a hierarchical tree with other files, the method comprising:

constructing a path between a requested file and a root node of a hierarchical tree;

processing each of a plurality of files that are included in the path in order from the root node of the hierarchical tree to the requested file;

overriding selectetd data in the plurality of files according to a predetermined criteria; and constructing a result set of the requested file.

2. The method according to claim 1, wherein the processing includes:

adding a keyword/value pair of a lower-level file for a keyword not in a corresponding section of an upper-level file to the resultant file.

3. The method according to claim 1, wherein the overriding includes:

replacing in a resultant file a first set of values associated with one or more keywords in an upper-level file with a second set of values associated with the one or more keywords in a lower-level file.

4. A method for performing an operation on a requested file stored in a hierarchical tree with other files, the method comprising:

constructing a path between a requested file and a root node of a hierarchical tree;

processing each of a plurality of files that are included in the path in order from the root node of the hierarchical tree to the requested file; and constructing a result set of the requested file by selectively overriding data from the plurality of files in the hierarchical tree path.

5. A program storage device readable by machine, tangibly embodying a program of instructions executable by the machine to perform method steps of performing an operation on a requested file stored in a hierarchical tree with other files, comprising:

constructing a path between a requested file and a root node of a hierarchical tree;

processing each of a plurality of files that are included in the path in order from the root node of the hierarchical tree to the requested file;

overriding selected data in the plurality of files according to a predetermined criteria; and constructing a result set of the requested file.

* * * * *